US012655870B2

(12) United States Patent
Türker

(10) Patent No.: US 12,655,870 B2
(45) Date of Patent: Jun. 16, 2026

(54) SLIDE BEARING GUIDE DEVICE, IN PARTICULAR LINEAR GUIDE DEVICE, WITH A PRE-LOADED SLIDING ELEMENT

(71) Applicant: igus SE & Co. KG, Cologne (DE)

(72) Inventor: Muhammet Erkam Türker, Nörvenich (DE)

( * ) Notice: Subject to any disclaimer, the term of this patent is extended or adjusted under 35 U.S.C. 154(b) by 15 days.

(21) Appl. No.: 18/697,357

(22) PCT Filed: Sep. 22, 2022

(86) PCT No.: PCT/EP2022/076417
§ 371 (c)(1),
(2) Date: Mar. 29, 2024

(87) PCT Pub. No.: WO2023/052242
PCT Pub. Date: Apr. 6, 2023

(65) Prior Publication Data
US 2024/0401638 A1       Dec. 5, 2024

(30) Foreign Application Priority Data
Oct. 1, 2021     (DE) ..................... 20 2021 105 330.5

(51) Int. Cl.
*F16C 29/02*          (2006.01)
*F16C 29/12*          (2006.01)

(52) U.S. Cl.
CPC ............ *F16C 29/02* (2013.01); *F16C 29/123* (2013.01)

(58) Field of Classification Search
CPC ...... F16C 29/001; F16C 29/002; F16C 29/02; F16C 29/12; F16C 29/123; F16C 41/02
See application file for complete search history.

(56) References Cited

U.S. PATENT DOCUMENTS 1,285,628  A  *  11/1918  Craley ................... F16C 29/02
                                                                403/381
5,143,454  A      9/1992  Morita
(Continued)

FOREIGN PATENT DOCUMENTS

| CH | 663373 A5 | 12/1987 |
| CN | 104963944 A | 10/2015 |

(Continued)

OTHER PUBLICATIONS

European Patent Office, International Search Report and Written Opinion for PCT application No. PCT/EP2022/076417, Dec. 6, 2022, pp. 1-15.

(Continued)

*Primary Examiner* — James Pilkington
(74) *Attorney, Agent, or Firm* — Cahn & Samuels, LLP

(57) ABSTRACT

A linear guide device includes a rail, which has a rail body which is elongated in a longitudinal direction V and on the two transverse sides of which a respective guide portion extending along the longitudinal direction V is formed, and a carriage, which has a carriage body on which a first slide bearing portion abutting against a first of the guide portions and a second slide bearing portion abutting against a second of the guide portions. One of the slide bearing portions, respectively, engages at least partially around one of the guide portions on the respective transverse side for holding the carriage on the rail perpendicularly to the longitudinal direction. At least the first slide bearing portion includes a (Continued)

slide element, and the carriage includes a spring device which presses the slide element against the first guide portion.

14 Claims, 2 Drawing Sheets

(56)                References Cited

U.S. PATENT DOCUMENTS

| | | | | |
|---|---|---|---|---|
| 7,490,991 | B2 * | 2/2009 | Naruse | F16C 29/02 |
| | | | | 384/10 |
| 7,494,281 | B2 * | 2/2009 | Hidaka | F16C 29/123 |
| | | | | 408/100 |
| 10,584,746 | B2 * | 3/2020 | Moshammer | F16C 29/126 |
| 2006/0083447 | A1 | 4/2006 | Moshammer | |
| 2022/0356903 | A1 * | 11/2022 | Gallagher | F16C 29/002 |
| 2024/0392831 | A1 * | 11/2024 | Köching | F16C 29/10 |

FOREIGN PATENT DOCUMENTS

| | | | |
|---|---|---|---|
| DE | 2718362 | A1 | 2/1978 |
| DE | 4410159 | A1 * | 9/1995 ............. F16C 29/12 |
| JP | 2001003934 | A | 1/2001 |
| JP | 2003314545 | A | 11/2003 |
| JP | 3740708 | B2 | 2/2006 |

OTHER PUBLICATIONS

European Patent Office, Preliminary Report on Patentability for PCT application No. PCT/EP2022/076417, Oct. 16, 2023, pp. 1-22.
European Patent Office, English abstract for CH663373A5, retrieved Mar. 29, 2024.
European Patent Office, English abstract for JP3740708B2, retrieved Mar. 29, 2024.
European Patent Office, English abstract for JP2003314545A, retrieved Mar. 29, 2024.
European Patent Office, English abstract for DE2718362A1, retrieved Mar. 29, 2024.
The International Bureau of WIPO, English translation of International Preliminary Report on Patentability for PCT application No. PCT/EP2022/076417, Apr. 4, 2024, pp. 1-6.
Japan Patent Office, Office Action for JPN Patent Application No. 2024-519871, Dec. 23, 2025, pp. 1-8.
Korean Patent Office, Office Action for KOR Patent Application No. 10-2024-7014334, Dec. 5, 2025, pp. 1-7.

* cited by examiner

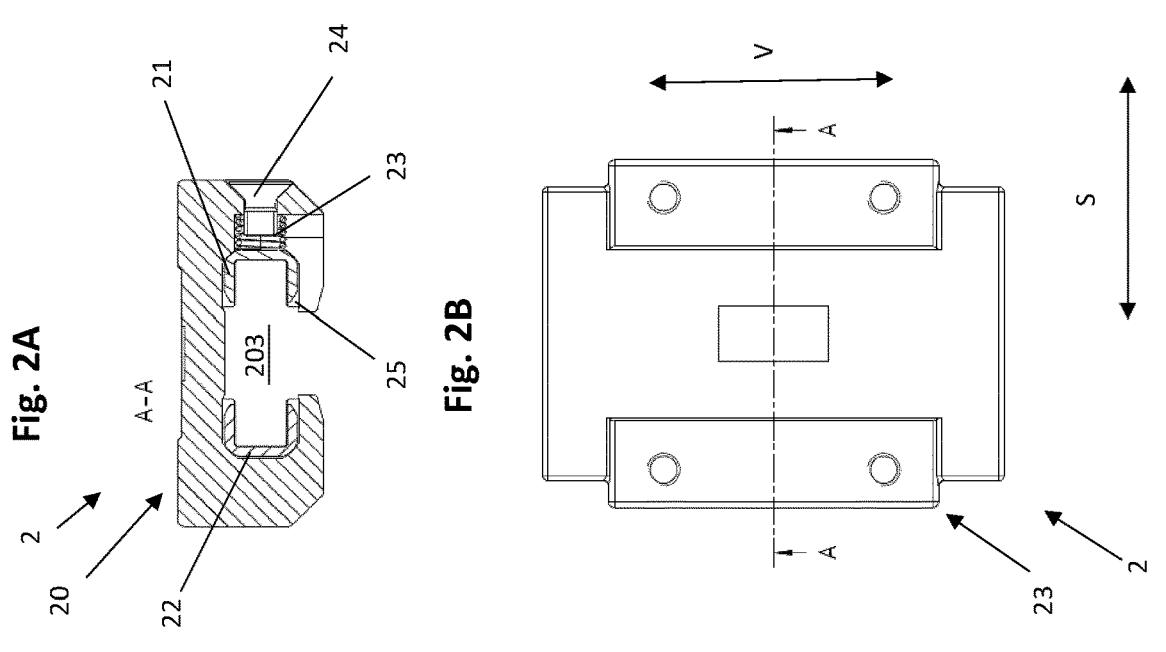
Fig. 2A
Fig. 2B
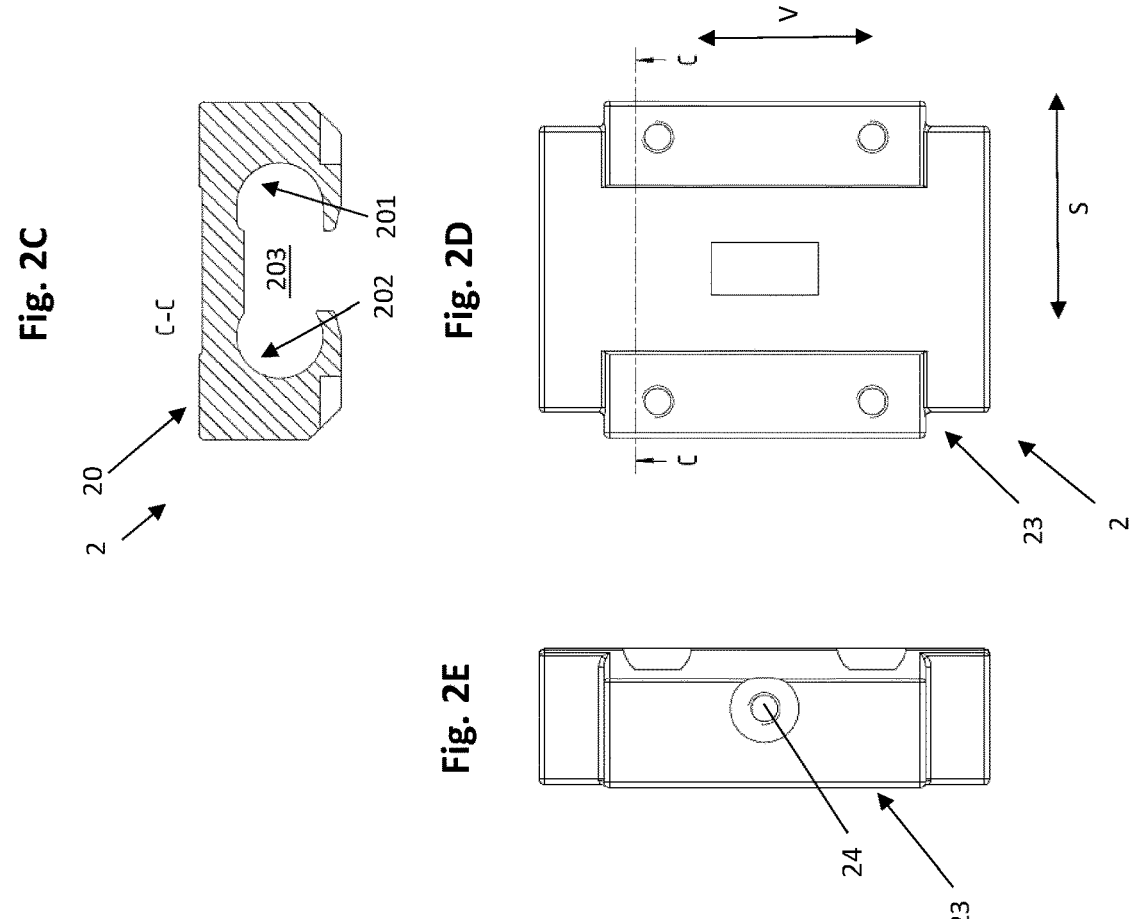
Fig. 2C
Fig. 2D
Fig. 2E

SLIDE BEARING GUIDE DEVICE, IN PARTICULAR LINEAR GUIDE DEVICE, WITH A PRE-LOADED SLIDING ELEMENT

FIELD OF THE INVENTION

The invention relates to a slide bearing guide device, in particular a linear guide device, a carriage for such a slide bearing guide device or linear guide device, and a use of the linear guide device, in particular for lubrication-free mounting without the use of lubricants (dry operation).

BACKGROUND OF THE INVENTION

Guide devices of this kind are known. They are used, for example, for sliding linear guidance in work equipment, manufacturing plants, measuring instruments or the like. In prior art, both linear guide devices for guidance along a straight guide path and designs for guidance along a curved guide path are known, which are also regarded as (curvilinear) linear guide devices. Generally, linear guide devices exist in a wide variety of sizes, with different design restrictions applying depending on the size.

Such linear guide devices usually comprise a carriage that is slidingly supported on a rail of the linear guide device and is slidable back and forth over an elongated extension of the rail relative to the rail in a longitudinal direction, e.g. along a straight line or a curve. In the process, sliding surfaces of the carriage slide against guide surfaces of the rail, preferably without lubricant, i.e. without lubricant being provided between the surfaces sliding against each other. For the surfaces sliding against each other, material pairings are typically used that are characterized by a particularly low coefficient of friction, such as, for example, plastic-plastic or plastic-metal material pairings.

For example, the rail may be made of metal as an elongated profile with a substantially constant cross-sectional geometry, for example U-shaped, W-shaped, T-shaped or the like. The carriage typically includes a carriage body, which is usually parallelepipedal and often made of metal, and may include fixing means for fixing the carriage to a body to be guided. Similarly, the carriage may include fixing means for fixing to a body relative to which the aforementioned body is to be guided.

To realize a plastic-metal material pairing, it is known, for example, to form at least parts the rail of metal and slide bearing portions of the carriage slidingly abutting the parts of plastic.

In the case of generic slide bearing guide devices or linear guide devices, it is therefore not possible to completely avoid the fact that portions of the carriage and rail which slide against each other with continued use of the linear guide device wear out, resulting in undesirable play in the linear guide device. Prior art attempts in various ways to compensate for play due to wear. For example, it is known to design portions subject to wear as separately formed sliding elements that are replaced when a wear limit is exceeded, which involves frequent maintenance intervals. Other solutions envisage, for example, the arrangement of adjustable sliding elements in the carriage, which can be adjusted manually or automatically by means of a mechanism, e.g., a gear unit coupled thereto. However, such solutions have a complex structure with a large number of components, which in turn are subject to wear. Furthermore, linear guide devices of this type are too large or insufficiently compact for some applications.

Such solutions are particularly unsuitable for miniaturized linear guide devices, for example if a maximum extension of the carriage transverse to the longitudinal direction is to be 80 mm at maximum, in particular 60 mm at maximum. Out of CH 663 373 A5, JP 3 740 708 B2, JP 2003 314545 A, DE 2 718 362 A1, U.S. Pat. No. 10,584,746 B2 and US 2006 083 447 A1, several different linear bearing guide devices are known, at which a pretension between a rail and a carriage is provided by a spring device.

SUMMARY OF THE INVENTION

One object of the present invention is to provide a slide bearing guide device which at least partially removes at least one of the aforementioned disadvantages. In particular, the slide bearing guide device should enable automatic play reduction with a compact design. To achieve this object, the invention proposes a linear bearing guide device, in particular a linear guide device.

The linear bearing guide device according to the invention comprises as essential components a rail and a carriage.

For achieving the above-mentioned object, it is proposed according to the invention that at least one sliding element at least partially surrounds a corresponding guide portion of the rail on one side, in particular on the transverse side, and that the carriage comprises a spring device for play compensation, which spring device presses the surrounding sliding element as a whole or altogether against the corresponding guide portion of the rail relative to the second slide bearing portion along an adjusting direction transverse to the longitudinal direction, in particular on the transverse side.

The combination of a surrounding design of the sliding element with a simply designed spring device enables a particularly compact design of the carriage with automatic play reduction.

To simplify the design, the spring device preferably engages directly on the sliding element, i.e., without any other intermediate components.

In particular, the spring device can essentially consist of only one or a few spring elements acting resiliently.

The rail has an elongated, in particular linear or curvilinear, rail body in a longitudinal direction. On both transverse sides of the rail body, i.e., sides of the rail viewed in a transverse direction perpendicular to the longitudinal direction, a respective guide portion extending along the longitudinal direction, i.e., a first and a second guide portion, is formed in particular integrally with the rail body.

In particular, the rail can be a T-rail, preferably with a compact profile cross-section.

Particularly preferably, both guide portions are each formed on a same vertical side of the rail body, the vertical side preferably being opposite a fixing side of the rail, on which the rail can preferably be connected to external components. Particularly preferably, both guide portions extend over at least 80%, in particular at least 95%, of an extension of the rail in the longitudinal direction.

The carriage can be designed as a housing carriage for two sliding elements or for double sliding bearing.

The carriage preferably has a carriage body on which a first slide bearing portion and a second slide bearing portion are provided. The first slide bearing portion abuts against a first of the guide portions and the second slide bearing section abuts against a second of the guide portions.

Preferably, the slide bearing portions are slidably guided or supported as intended while maintaining their abutment against the guide portions relative to the guide portions, and are slidably guided accordingly. In one embodiment, the slide bearing portions and the carriage body are integrally formed. In another embodiment, the carriage body and at least one, in particular both, of the slide bearing portions are formed separately, wherein in particular the carriage body is made of a different material than the slide bearing portions. The carriage is guided on the guide portions in a longitudinally slidable manner relative to the rail by means of its slide bearing portions.

Preferably, the carriage is connected to the rail exclusively via its slide bearing portions that abut against the guide portions of the rail.

One of the slide bearing portions in each case surrounds one of the guide portions on the respective transverse side at least partially for holding the carriage on the rail in at least one direction perpendicular to the longitudinal direction, preferably completely immovably and neglecting play. Preferably, the first slide bearing portion engages around the first guide portion and the second slide bearing section engages around the second guide portion.

According to the invention, at least the first slide bearing portion comprises a separate sliding element. Preferably, the first slide bearing portion abuts, in particular exclusively, with the sliding element against the respective guide portion.

The spring device, which urges or presses the sliding element against the first guide portion relative to the second slide bearing portion along an adjusting direction running transversely to the longitudinal direction, in particular parallel to the transverse direction, effects the compensation of play.

By means of the spring device, the slide bearing portions are preferably preloaded relative to each other or against the guide portions in the adjusting direction. This takes place in particular while creating a closed force flow transverse to the longitudinal direction, which passes at least through the carriage body, spring device, sliding element, first guide portion, rail body, second guide portion and second slide bearing portion, in particular in this sequence.

Generally preferably, the sliding element is detachably received in the carriage body, the sliding element being designed to compensate for a change in cross-section of the rail along the adjusting direction by displacing the sliding element in the adjusting direction relative to the second slide bearing portion.

The preferably passive spring device can cause a substantially continuous abutment of the sliding element against the first guide portion by urging, pressing or biasing the sliding element against the first guide portion.

Particularly preferably, the spring device causes an increase in the urging—or pressing force along the adjusting direction when the sliding element is displaced in a direction away from the rail. Particularly preferably, the slide bearing guide device or linear guide device is formed with a plate-like carriage which is intended to be loaded predominantly in a load direction by an external force which is substantially perpendicular to the adjusting direction and, in particular, substantially perpendicular to the longitudinal direction.

Preferably, a respective one of the slide bearing portions surrounds the respective guide portion in such a way that the respective slide bearing portion engages behind the respective guide portion on both sides of a sliding surface of the respective slide bearing portion, which sliding surface is pressed against the respective guide portion in the actuating direction, perpendicular to the actuating direction. The same applies to the sliding element or elements as such. According to the invention it is intended that at least the first slide bearing portion comprises a sliding element, wherein the spring-loaded sliding element is pressed against the first guide portion of the rail in the actuating direction and engages behind the first guide portion at both sides in a direction perpendicular to the actuating direction.

The slide bearing guide device or linear guide device according to the invention has a particularly robust design due to its simple construction and can be highly miniaturized without any problems. It has been found, among other things, that it is already sufficient if the force with which the sliding element is pressed against the first guide portion by means of the spring device is very low, in particular less than 20N, preferably less than 15N, particularly preferably ≤10N, and/or at least 2N, in order to ensure effective play compensation.

According to a preferred embodiment, it is sufficient that play compensation is provided exclusively along a single spatial direction corresponding to the actuating direction, because in many applications it is predominantly play perpendicular to the load direction that leads to imprecise guiding properties.

According to an advantageous embodiment, the spring device comprises a resiliently deflected spring element. In a preferred embodiment, the spring element is designed as a helical compression spring or spiral spring, in particular made of suitable metal. In another embodiment, the spring element may be formed, for example, as a rubber-elastic plastic component.

The spring device automatically urges or presses the sliding element against the guide portion with a suitable preload or pressing force, wherein in the advantageous embodiment the force depends on a deflection of the spring element. Preferably, the spring element has a spring force proportional to the deflection, which spring force acts in particular in the actuating direction. Particularly preferably, the spring element is deflected in each position of the carriage, wherein in each of the positions the sliding element is urged or pressed against the first guide portion by the spring device. Particularly preferably, the spring element is disposed within the carriage body, which allows for a compact design.

Particularly preferably, the carriage comprises an adjustment guide device which guides the sliding element displaceably relative to the slide body over an adjustment path along the adjusting direction. Particularly preferably, the carriage body forms a first part of the adjustment guide device for this purpose, which interacts positively with a second part of the adjustment guide formed by the sliding element, in particular in the manner of a tongue-and-groove connection. Particularly preferably, the adjustment guide device prevents displacement of the sliding element in the longitudinal direction along the adjustment path. Preferably, the sliding element is guided in the adjustment guide device relative to the carriage body in such a way that it can be displaced exclusively in the adjusting direction.

Generally, displaceability means displaceability on both sides, i.e., suitability for reciprocating displacement. Preferably, the adjustment guide device has at least one stop that limits the adjustment path. Particularly preferably, the adjustment guide device has two stops that limit the adjustment path to both sides. The stop, in particular the stops, is or are designed to prevent displacement of the sliding element in the adjusting direction beyond the adjustment path when in direct contact with the sliding element. In particular, the adjustment guide device prevents tilting of the sliding element perpendicular to the adjusting direction.

According to a preferred embodiment, the spring device engages the sliding element in the longitudinal direction at the level of the adjustment guide device. This preferably means that the force can be transmitted from the spring device to the sliding element in the adjusting direction at the level of the adjustment guide device. Particularly preferably, the spring device engages the sliding element in a central region of the carriage and/or of the sliding element, the central region meaning a region which is spaced apart from both absolute extension ends of the component having the region in the longitudinal direction by at least 20%, in particular by at least 30%, of a maximum extension of the respective component in the longitudinal direction. As a result, the sliding element can be urged or pressed against the first guide portion without tilting or canting.

According to a generally preferred embodiment, the second slide bearing portion comprises a further sliding element.

The sliding elements are preferably one-piece plastic components of identical construction.

Preferably, one of the sliding elements in each case at least partially surrounds one of the guide portions on the respective transverse side. Particularly preferably, the further sliding element is held immovably on the carriage body. Generally preferably, the first slid bearing portion consists of the sliding element and/or the second slide bearing portion consists of the further sliding element. By providing the sliding elements, the carriage body can be designed in favor of a good load-bearing capacity and the sliding elements can be designed in favor of a good sliding capacity.

According to a preferred embodiment, at least three sliding surfaces are provided, wherein at least two of the sliding surfaces of each of the sliding bearing portions are in sliding contact with different sides, i.e., sides perpendicular to the longitudinal direction, of each of the guide portions. The sliding surfaces of one of the sliding bearing portions in each case differ in particular in that they point in different directions, wherein preferably several sliding surfaces of one of the slide bearing portions can pass into each other without interruption. In particular at least one, in particular at least two, in particular at least three of the sliding surfaces of the first slide bearing portion is or are formed by the sliding element. Preferably, at least one, in particular at least two, in particular at least three of the sliding surfaces of the second slide bearing portion is or are formed by the further sliding element. Preferably, the sliding surface of the first slide bearing portion facing the transverse side in the adjusting direction is formed by the sliding element. In particular, the sliding surfaces of the slide bearing portions are arranged relative to one another in such a way that at least two of the sliding surfaces face one another and/or at least two sliding surfaces of one of the slide bearing portions extend essentially parallel opposite one another. Particularly preferably, at least one of the sliding surfaces is interrupted in its extension in the longitudinal direction by a central region, the central region preferably having a clearance surface which is spaced apart from the rail and is set back relative to the adjacent clearance surface. As a result, a defined minimum guide length, in particular of at least 10 mm in each case, is specified for the sliding contact of the guide portion and the slide bearing portion, as a result of which canting is prevented. Preferably, at least two of the sliding surfaces of a slide bearing portion are always in contact with the corresponding guide portion, at least one of which points in the direction of adjustment.

According to a preferred embodiment in which the second slide bearing portion comprises the further sliding element, preferably at least one, in particular at least two, in particular at least three of the sliding surfaces of the second slide bearing portion are formed by the further sliding element.

Preferably, the sliding surfaces formed by the sliding elements face each other along the adjusting direction.

Particularly preferably, the sliding elements are of similar or identical design, wherein the sliding elements each have an outer contour which, in particular along the longitudinal direction, is substantially cylindrical, in particular circular-cylindrical, at least in sections, in particular over at least 60%, in particular at least 70%, in particular at least 80% of an extension of the sliding element in the longitudinal direction.

According to a preferred embodiment, the carriage body has at least one receiving region that comprises a receiving space for receiving the sliding element, which is formed at least in sections of the outer contour of the sliding element and is, in particular, substantially cylindrical, in particular circular-cylindrical, at least in sections. Generally preferably, the carriage body is designed in such a way that it at least partially surrounds both of the guide portions on their respective transverse side, in particular without directly abutting the guide portions. In the receiving space formed by the receiving region, the sliding element is held on the carriage body, in particular in such a way that it comes to bear between the carriage body and the respective guide portion, in particular directly. The receiving space is widened in such a way that the sliding element is displaceable in the receiving space relative to the carriage body over the adjustment path along the adjusting direction. For this purpose, for example, the inner contour of the receiving space can copy an outer contour of the sliding element, which is circular-cylindrical at least in sections, in such a way that it has an inner contour, which is oval-cylindrical at least in sections, wherein a radius of extension of the receiving space essentially coincides with an outer radius of the outer contour of the sliding element. Particularly preferably, the carriage body has a further receiving region which comprises a receiving space for receiving the further sliding element, which receiving space copies at least sections of the outer contour of the further sliding element and is, in particular, essentially cylindrical, in particular circular-cylindrical, at least in sections and in which the further sliding element is held on the carriage body, in particular immovably. Features disclosed with respect to the receiving space are accordingly transferable to the further guide portion, i.e., with respect to the further sliding element. By means of the guide portion, the sliding element is held in the carriage body, the carriage body being held on the rail via the sliding element with its guide portions.

According to a preferred embodiment, the rail is passed through a passage of the carriage body in the longitudinal direction. As a result, at least one portion, in particular the guide portions, is or are preferably received in the carriage body in each position. In this case, the respective receiving space adjoins the passage, in particular it passes over into the passage. According to the preferred embodiment, at least one, in particular both, of the sliding elements is or are accommodated in the passage so as to be applied under elastic deflection against the respective receiving region for holding against the respective receiving region. This means in particular that for holding the sliding element against the respective receiving region, the sliding element is first arranged in the passage, whereupon the sliding element is displaceable, in particular along the adjusting direction, into the respective receiving space under elastic deflection of at least sections of the respective sliding element. Generally, elastic deflection is to be understood as a deflection relative to a rest position, the deflection being generated by the action of an external force under creation of an inherent counterforce (spring force). Particularly preferably, the sliding element is held in the receiving region without deflection.

Particularly preferably, the carriage body is made from a base material, in particular using a die casting process. A wide range of materials with particularly good strength and/or rigidity can be used as the base material. A zinc alloy has proved particularly suitable as a base material, the carriage body preferably being produced by a zinc die-casting process and particularly preferably being further processed by mechanical production processes, in particular by machining. Preferably, the sliding element and/or the further sliding element is made from a sliding material that differs from the base material, in particular using a plastic injection molding process.

For certain applications, embodiments in which the base material and the sliding material are identical are also possible. In particular, a tribologically optimized plastic, in particular tribopolymer, which can preferably be processed by plastic injection molding, has proven itself as a sliding material.

In particular, the tribopolymers applicable here include the thermoplastics polyethene, polypropylene, polyacetal, polycarbonate, polyamide, polyvinyl chloride, polytetrafluoroethene and, in the case of thermosets, phenolic resins. To further reduce friction, these plastics may contain lubricants, in particular fine-particle solid lubricants, such as molybdenum disulfide or graphite. Such polymers are also referred to herein as tribopolymers. Since friction also reduces wear and also abrasion, these products are particularly appropriate where high purity is required, such as in the food and semiconductor industries, and in biochemical and microbiological applications. The polymeric materials can also contain fillers and fibrous materials, for example of plastic or textile, to improve the mechanical properties. The tribologically optimized plastic or tribopolymer is preferably formed from a compound. The compound preferably contains a base polymer, for example a thermoplastic, in particular polyethylene, polypropylene, polycarbonate, polyamide, polyvinyl chloride or polytetrafluoroethylene. The compound preferably contains particles acting as solid lubricants, for example molybdenum disulfide and/or graphite. The compound preferably contains one or more fillers, for example reinforcing fibers and/or reinforcing particles. Preferably, the rail is formed in one piece. Preferably, the rail is made of a metal material which contains, in particular, aluminum and/or an aluminum alloy and which is preferably hard anodized, resulting in advantageous sliding and abrasion properties in a material pairing with plastic.

Particularly preferably, the sliding element and/or the further sliding element has an offset fixing portion which engages behind a corresponding fixing portion of the carriage body for fixing the respective sliding element along the longitudinal direction. Particularly preferably, the fixing portions are each arranged in the longitudinal direction at the level of the spring device and/or at the level of the adjustment guide device. Particularly preferably, the fixing portion of the sliding element and the fixing portion of the second or further sliding element are arranged at the same level. Particularly preferably, all of the fixing portions are arranged at the level of the central region of the carriage body, whereby the carriage can be of particularly simple design.

According to a preferred embodiment, the carriage body has an access opening, preferably on a side perpendicular to the longitudinal direction, for inserting at least parts of the spring device, in particular the spring element, into the carriage body. Particularly preferably, the fixing portion of the carriage body extends beyond the access opening on both sides along the longitudinal direction. In this way, access openings and fixing portion can be arranged in a particularly space-saving manner without adversely affecting the respective function.

Generally, particularly preferably, the carriage has an anti-rotation portion for at least one, in particular for both, of the sliding elements, which, when in contact with the respective sliding element, in particular with its fixing portion, prevents rotation of the sliding element relative to the carriage body about an axis of rotation extending in the longitudinal direction. For this purpose, the anti-rotation portion can preferably have a plurality of planar surfaces pointing in different directions and bearing against the sliding element, which planar surfaces, when in contact with the sliding element, block the rotation of the sliding element relative to the carriage body. The anti-rotation portion ensures that the intended position of the sliding element in the carriage body is maintained even when the carriage is not guided on the rail.

Generally preferably, each sliding element extends continuously over at least 80%, in particular at least 90% of a maximum extension of the carriage body along the longitudinal direction. Particularly preferably, all of the sliding surfaces of the first slide bearing portion are formed by the sliding element, in particular over at least 90% of the extension of the sliding element along the longitudinal direction. Particularly preferably, all of the sliding surfaces of the second slide bearing portion are formed by the further sliding element, wherein the sliding surfaces of the second slide bearing portion preferably extend over at least 90% of the extension of the sliding element in the longitudinal direction.

The invention further relates to a carriage per se, which is designed for a slide bearing guide device according to the invention. The carriage has a carriage body on which a first slide bearing portion is provided for abutment with a first guide portion of a rail of the slide bearing guide device or linear guide device, and a second slide bearing portion is provided for abutment with a second guide portion of the rail. The slide bearing portions are designed to guide the carriage, in particular the carriage body, in a longitudinally displaceable manner on the guide portions relative to the rail, wherein one of the slide bearing portions is designed to at least partially engage around one of the guide portions in each case. The slide bearing portions engaging around the guide portions hold the carriage on the rail perpendicular to the longitudinal direction.

According to the invention, the carriage comprises a spring device configured to urge or press the sliding element transversely and laterally against the first guide portion relative to the second slide bearing portion along an adjustment direction transverse to the longitudinal direction to compensate for play.

Generally, the carriage may have one or more of the preferred features disclosed above in connection with the carriage.

The invention further relates to a use of the slide bearing guide device or linear guide device according to the invention, for lubrication-free plain bearing of a movable component in a machine or system.

With regard to the mode of operation, it can be provided in particular that the spring device presses the sliding element altogether and as a whole laterally against the first guide portion relative to the second slide bearing portion along an adjusting direction transverse to the longitudinal direction or transversely. By means of the passive spring device, the sliding element is automatically displaced relative to the second slide bearing portion in the adjusting direction for automatic play compensation of the linear guide device during operation.

BRIEF DESCRIPTION OF THE DRAWINGS

A preferred embodiment of the invention will be described in more detail below with reference to two drawing figures without limitation. In the drawing it is shown by:

FIGS. 2A-2E sectional views or side and plan views of a carriage according to the invention shown in FIG. 1.

DETAILED DESCRIPTION

Figure 1:
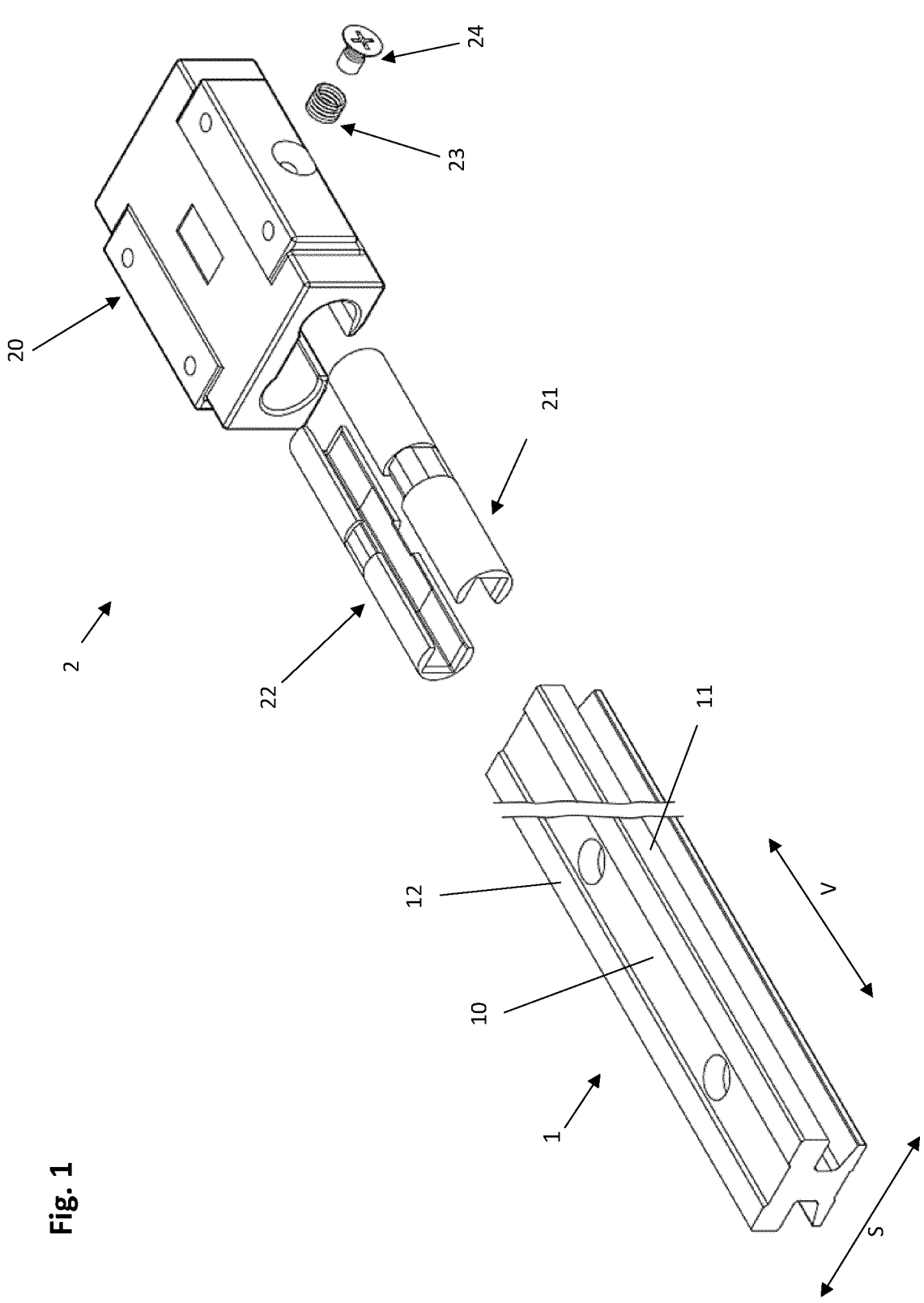
FIG. 1 an exploded view of a preferred embodiment of the linear guide device according to the invention.

FIG. 1 shows an exploded view of an embodiment of a linear guide device according to the invention in a schematic representation. The linear guide device comprises a rail 1 and a carriage 2 that is designed to be guided in sliding contact relative to the rail 1. The rail 1 is designed as a one-piece profile elongated in a longitudinal direction V along which the carriage 2 is displaced relative to the rail 1. The rail 1 is made of a hard-anodized aluminum alloy. The rail 1 comprises a rail body 10, on the two transverse sides of which a respective guide portion 11, 12 extends formed integrally with the rail body 10. Several through bores spaced apart by an equal distance along the longitudinal direction V are provided in the rail body 10. The through bores are used for fixing the rail 1 by means of suitable fixing means. The rail 1 is shown interrupted and extends along its entire extension rectilinearly in the longitudinal direction. Each of the guide portions of 11, 12 has a plurality of guide surfaces, all of the guide surfaces of one of the guide portions 11, 12 facing in different spatial directions, respectively. Two of the guide surfaces of each of the guide portions 11, 12 extend substantially parallel facing in opposite directions, with an intermediate one of the guide surfaces of each of the guide portions 11, 12 extending perpendicularly thereto. As a result, the rail 1 has a substantially T-shaped cross-section along its entire extent along the longitudinal direction V.

The carriage 2 comprises a carriage body 20 which is substantially parallelepipedal in shape and has two protruding fixing portions, each of which has two threaded holes adapted to be connected to a body by means of suitable fastening means. A first slide bearing portion and a second slide bearing portion are provided on the carriage body 20, by means of which slide bearing portions the carriage 2 can be slidably guided on the guide portion 11, 12 relative to the rail 1 in the longitudinal direction. In this case, the first slide bearing portion has a sliding element 21 formed separately from the carriage body 20, and the second sliding bearing portion has a further sliding element 22 formed separately from the carriage body 20. The sliding elements 21, 22 are preferably one-piece, identical injection-molded parts made of a tribopolymer.

The guide portions each engage with their sliding elements 21, 22 around one of the guide portions 11, 12 on the respective transverse side at least partially when the components of the linear guide device shown in exploded view are assembled, whereby the carriage 2 is held on the rail 1 perpendicular to the longitudinal direction V, while enabling a sliding displacement of the carriage 2 relative to the rail 1 along the longitudinal direction. The carriage further comprises a spring device having a spring element 23, here for example a helical compression spring. As intended, the spring element 23 is accommodated in the carriage body 20 and acts, in particular in a resiliently deflected manner, between the sliding element 21 and the carriage body 20. By means of the spring element 23, the spring device urges or presses the sliding element 21 against the first guide portion 11 along an adjusting direction S and thereby the second guide portion 12 against the further sliding element 22 of the second slide bearing portion. This creates a play compensation of the linear guide device along the adjusting direction without affecting the sliding properties of the components of the linear guide device acting perpendicularly thereto.

FIGS. 2A to 2E each schematically show the carriage 2 of the exemplary embodiment of the linear guide device of FIG. 1 in a plan view, side view and in two sectional views. The sectional views in FIGS. 2A and 2C refer to two differently positioned sections of the carriage 2 perpendicular to the longitudinal direction V in FIGS. 2B and 2D, the sections being spaced from one another along the longitudinal direction V. The carriage body 20 has a passage 203 through which the rail 1 with its guide portions 11, 12 is passed as intended. Adjacent to the passage 203, the carriage body 20 has a receiving region 201, 202 on both sides along the adjusting direction, each of which forms a receiving space for receiving the sliding element 21 and the further sliding element 22, respectively. The sliding elements 21, 22 are held on the carriage body 20 by means of the receiving region 201, 202. The carriage 1 further has an adjustment guide device 25 formed as a recess integral with the carriage body 20, along which the sliding element 21 can be slidingly displaced relative to the carriage body 20 over an adjustment path. Thus, the receiving space of the receiving region 201 and the receiving space of the further receiving region 202 are formed differently in such a way that the further sliding element 22 is held immovably on the carriage body 20, the sliding element 21 being held displaceably in the carriage body 20 along the adjusting direction S over a displacement distance. The spring element 23 of the spring device in the carriage body 20 presses against the sliding element 21 in the adjusting direction S, and the sliding element 21 presses against the first guide portion 11 to compensate for the play of the linear guide. The adjustment path of the sliding element 21 is limited by stops, which is realized by a cross-sectional reduction of the receiving space along the adjusting direction of the receiving section 201.

Both sliding elements 21, 22 are formed substantially in the same manner, each of the sliding elements 21, 22 having in sections thereof a substantially circular-cylindrical outer contour which is interrupted in the central region in each case by a fixing portion which is offset with respect to the surrounding outer contour and is designed to engage behind a corresponding fixing portion of the carriage body 20 for fixing the respective sliding element 21, 22 along the longitudinal direction V. In the center portion, a plurality of planar surfaces are further formed on the outer contour of the respective sliding element 21, 22 to abut corresponding surfaces in the carriage body 20, whereby rotation of the respective sliding element 21, 22 relative to the carriage body 20 about an axis of rotation extending in the longitudinal direction V is inhibited. Accordingly, the planar surfaces jointly form an anti-rotation portion of the respective sliding element 21, 22. Generally advantageously, the sliding elements 21, 22 each extend along the longitudinal direction V over almost the entire extension of the carriage body 20 along the longitudinal direction V. Accordingly, in the sectional view C, the sliding elements 21, 22 are hidden in order to better show the substantially cylindrical inner contour of the respective receiving space of the receiving regions 201, 202.

The carriage 2 comprises a fixing element 24 that fixes the spring element 23 to the carriage body in at least one direction perpendicular to the adjusting direction and, in particular, perpendicular to the longitudinal direction. In a preferred embodiment, the fixing element 24 is designed as a screw that is screwed into the carriage body from an outer side of the carriage body and is connected to the spring element, as a result of which the spring element 23 is fixed to the carriage body, in particular in a form-fitting manner. In a preferred embodiment, at least one portion of the fixing element 24 is arranged to overlap with the spring element 23 in such a way, in particular along the direction of adjustment, that the portion cooperates with the spring element 23, in particular as a spring mandrel, for spring guidance. Particularly preferably, the carriage body comprises an access opening through which the spring element is inserted in a direction perpendicular to the adjusting direction to its intended position in the carriage body and is fixed by the fixing element. Particularly preferably, the spring element 23 directly abuts against the carriage body and/or against the first sliding element 21. Preferably, the force dependent on the deflection of the spring element 23 acts directly on the carriage body and/or the sliding element 21.

Other notable advantages of the invention are:

lubrication-free running (without lubricant);

stepless, smooth sliding of the carriage;

firm support of the carriage (positional stability);

quiet and rattle-free operation;

simple design of the play adjustment, and compact design of rail and carriage.

LIST OF REFERENCE SIGNS

1 rail

2 carriage

10 carriage body

11 first guide portion

12 second guide portion

20 carriage body

21 sliding element

22 further sliding element

23 spring element

24 fixing element

25 adjustment guide device

201 receiving region

202 further receiving region

203 passage

S adjusting direction

V longitudinal direction

The invention claimed is:

1. A slide bearing guide device comprising:

a rail including a rail body elongated in a longitudinal direction and having a first and a second transverse sides, a first and a second guide portion formed on the first and the second transverse side of the rail body, respectively, the first and the second guide portion extending along the longitudinal direction; and a carriage having a carriage body on which a first slide bearing portion abutting against the first guide portion and a second slide bearing portion abutting against the second guide portion are provided, the carriage being slidably guided by the first and the second slide bearing portions along the first and the second guide portions of the rail in the longitudinal direction, and wherein a respective one of the first and the second slide bearing portions at least partially engages around the respective one of the first and the second guide portions on the respective first and second transverse side for holding the carriage on the rail perpendicularly to the longitudinal direction, wherein the first slide bearing portion comprises a first sliding element, wherein the carriage further includes a spring device for play compensation, wherein the spring device presses the first sliding element against the first guide portion along an adjusting direction transverse to the longitudinal direction and towards the second slide bearing portion, wherein the first sliding element is pressed against the first guide portion of the rail in the adjusting direction and engages around the first guide portion on the first transverse side and at both sides with respect to a direction perpendicular to the adjusting direction and perpendicular to the longitudinal direction, wherein the first sliding element is made of a plastic having tribological additives, wherein the second slide bearing portion comprises a second sliding element, wherein the carriage body forms a respective receiving region for each of the first and the second sliding elements in the corresponding slide bearing portion, wherein each receiving region comprises a respective receiving space substantially conjugate to an outer contour of the respective first or second sliding element for receiving the respective first or second sliding element, and wherein the respective receiving space is substantially cylindrically or circular-cylindrically at least in sections.

2. The slide bearing guide device according to claim 1, wherein the spring device comprises at least one spring element resiliently acting along the adjusting direction(S), and wherein the carriage further includes a fixing element which fixes the spring element to the carriage body at least in a direction perpendicular to the adjusting direction.

3. The slide bearing guide device according to claim 1, wherein the carriage comprises an adjustment guide device which displaceably guides the sliding element relative to the carriage body over an adjustment path along the adjustment direction.

4. The slide bearing guide device according to claim 1, wherein the spring device engages directly with the sliding element.

5. The slide bearing guide device according to claim 1, wherein at least one of the first and the second sliding element has at least three sliding surfaces, wherein at least two of the three sliding surfaces in each case slidingly abut against respectively different sides of one of the respective first or second guide portion and/or wherein, of the three sliding surfaces, at least two sliding surfaces neighboring each other are essentially perpendicular to one another.

6. The slide bearing guide device according to claim 5, wherein the first and the second sliding elements are of the same type and of identical configuration, wherein each of the first and the second sliding elements is made in one piece and has an outer contour which is substantially cylindrical at least in sections.

7. The slide bearing guide device according to claim 5, wherein the carriage body is made from a metallic base material, wherein the first and the second sliding elements are made from a sliding material different from the base material.

8. The slide bearing guide device according to claim 5, wherein the first sliding element and/or the second sliding element extends or extend continuously over at least 80% of an extension of the carriage body in the longitudinal direction.

9. A slide bearing guide device according to claim 5, wherein the carriage body is made from a metallic base material by a die-casting process, and the first and the second sliding element are made from a tribopolymer by an injection molding process.

10. The slide bearing guide device according to claim 1, wherein at least one of the first and the second sliding elements is arrangeable in the respective receiving space under elastic deflection of the sliding element.

11. The slide bearing guide device according to claim 1, wherein
  the carriage body comprises an access opening for inserting the spring device into the carriage body.

12. A use of a slide bearing guide device according to claim 1 for lubrication-free sliding support of a movable component in a machine or system.

13. A carriage for a linear guide device, the carriage comprising:
  a carriage body on which a first slide bearing portion is provided for abutment against a first guide portion of a rail of the linear guide device and a second slide bearing portion is provided for abutment against a second guide portion of the rail, wherein the first slide bearing portion and the second slide bearing portion are configured for guiding the carriage slidably on the first and the second guide portions of the rail in a longitudinal direction, wherein each one of the first and the second slide bearing portions is respectively configured to engage at least partially around one of the first and the second guide portions, respectively, for holding the carriage on the rail perpendicular to the longitudinal direction, wherein the first slide bearing portion comprises a first sliding element; and
a spring device for compensation of play, wherein the spring device is configured to press the first sliding element (21) as a whole against the first guide portion along an adjusting direction transverse to the longitudinal direction and towards the second slide bearing portion, wherein the first sliding element is pressed against the first guide portion of the rail in the adjusting direction and engages around the first guide portion on a first transverse side and at both sides with respect to a direction perpendicular to the adjusting direction and perpendicular to the longitudinal direction,
wherein the first sliding element is made of a plastic having tribological additives,
wherein the second slide bearing portion comprises a second sliding element,
wherein the carriage body forms a respective receiving region for each of the first and the second sliding elements in the corresponding slide bearing portion, wherein each receiving region comprises a respective receiving space substantially conjugate to an outer contour of the respective first or second sliding element for receiving the respective first or second sliding element, and
wherein the respective receiving space is substantially cylindrically or circular-cylindrically at least in sections.

14. The carriage according to claim 13, wherein the spring device comprises at least one spring element resiliently acting along the adjusting direction, and
  wherein the carriage further includes a fixing element which fixes the spring element to the carriage body at least in a direction perpendicular to the adjusting direction.

* * * * *